United States Patent [19]
De Buhr

[11] 3,825,812
[45] July 23, 1974

[54] RECTIFIER BRIDGE SILICON CONTROLLED RECTIFIER TRIGGER CIRCUIT

[75] Inventor: Alfred P. De Buhr, Downers Grove, Ill.

[73] Assignee: General Motors Corporation, Detroit, Mich.

[22] Filed: Apr. 11, 1973

[21] Appl. No.: 350,078

[52] U.S. Cl. .................................. 321/5, 321/18
[51] Int. Cl. ............................................ H02m 1/08
[58] Field of Search ........ 321/5, 18; 323/22 SC, 24, 323/34, 38

[56] References Cited
UNITED STATES PATENTS

| | | | |
|---|---|---|---|
| 3,329,883 | 7/1967 | Frierdich | 321/5 |
| 3,375,427 | 3/1968 | Magner et al. | 321/18 X |
| 3,390,321 | 6/1968 | Plow | 321/18 X |
| 3,579,079 | 5/1971 | Kelley | 321/5 |

Primary Examiner—A. D. Pellinen
Attorney, Agent, or Firm—Richard G. Stahr

[57] ABSTRACT

Corresponding to each silicon controlled rectifier of a three-phase bridge rectifier circuit is a center tapped and an untapped secondary winding pair of a three-phase transformer, a pilot silicon controlled rectifier, a capacitor and an output winding of a magnetic amplifier. Each center tapped secondary winding supplies gate-cathode current to the pilot silicon controlled rectifier which corresponds to the same bridge circuit silicon controlled rectifier through the corresponding output winding of the magnetic amplifier. Each untapped secondary winding supplies gate-cathode current to the corresponding bridge circuit silicon controlled rectifier through the anode-cathode electrodes of the corresponding pilot silicon controlled rectifier and charging current to the corresponding capacitor. Each capacitor is also connected across another one of the untapped secondary windings which places a charge thereon prior to the time the corresponding pilot silicon controlled rectifier is triggered conductive through the anode-cathode electrodes.

3 Claims, 1 Drawing Figure

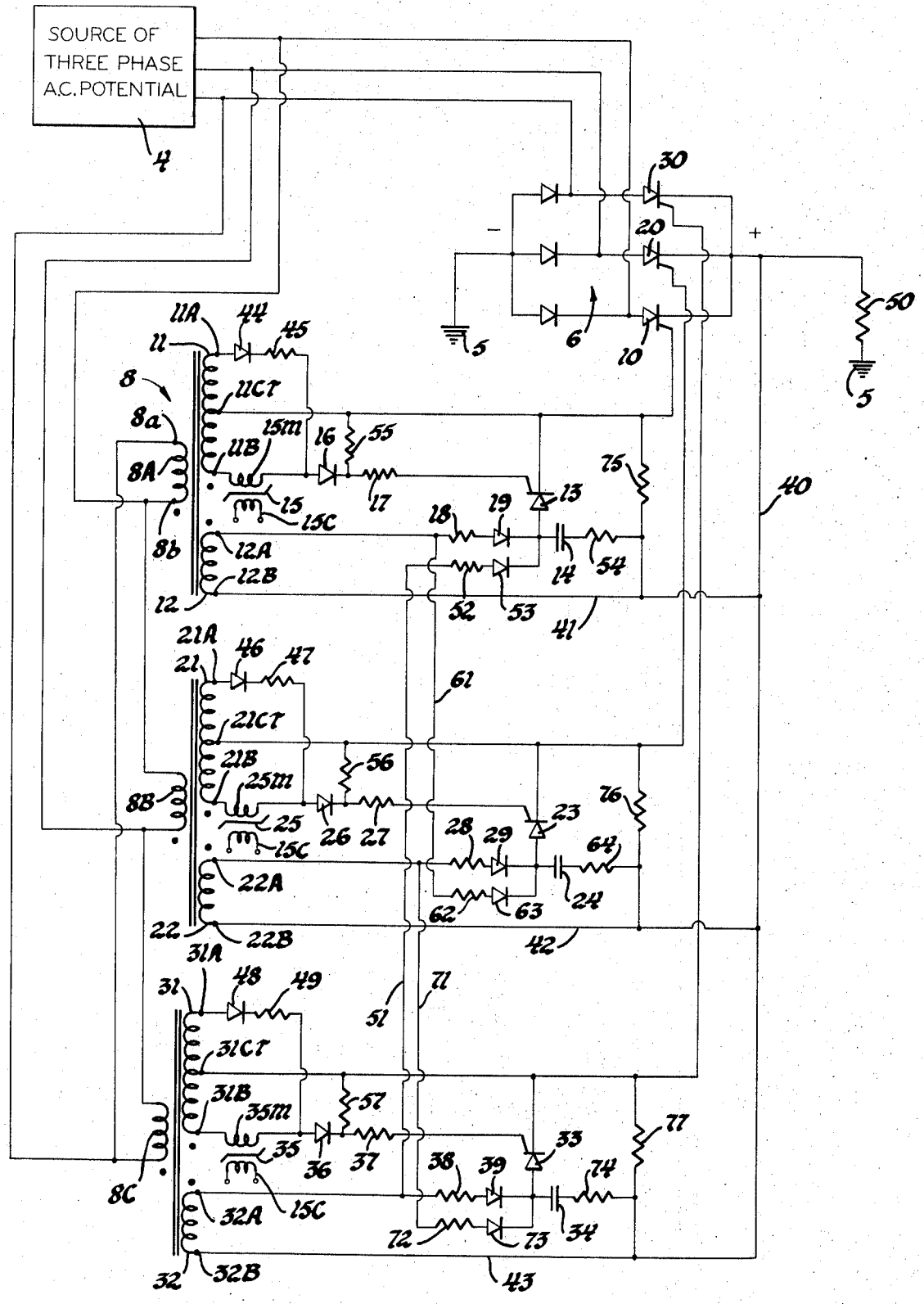

RECTIFIER BRIDGE SILICON CONTROLLED RECTIFIER TRIGGER CIRCUIT

The invention relates to a rectifier bridge silicon controlled rectifier trigger circuit and, more specifically, to a circuit which supplies gate-cathode power to each of the bridge silicon controlled rectifiers through a corresponding magnetic amplifier output winding and pilot silicon controlled rectifier.

With many applications, the magnitude of the direct current output potential of a three-phase bridge rectifier circuit is controlled by selectively switching the silicon controlled rectifiers of the positive polarity bank of diodes conductive through the anode-cathode electrodes at the proper angle of the alternating current supply potential. It is necessary that the trigger signal for the bridge silicon controlled rectifiers be of a rapid rise time and of sufficient duration to ensure that each silicon controlled rectifier is triggered conductive and remains conducting during the diode commutation period.

It is, therefore, an object of this invention to provide an improved rectifier bridge silicon controlled rectifier trigger circuit.

It is an additional object of this invention to provide an improved rectifier bridge silicon controlled rectifier trigger circuit which provides a trigger signal for each bridge circuit silicon controlled rectifier having a rapid rise leading edge and a trailing edge of sufficient duration to maintain the silicon controlled rectifier conductive during the diode commutation period.

It is an additional object of this invention to provide an improved rectifier bridge silicon controlled rectifier trigger circuit which automatically provides the bridge circuit silicon controlled rectifier trigger signals at the proper time to produce a desired potential magnitude output under the control of a magnetic amplifier.

In accordance with this invention, a rectifier bridge silicon controlled rectifier trigger circuit is provided wherein a trigger signal is provided for each silicon controlled rectifier of a three-phase bridge-type full-wave rectifier circuit by the discharge of a capacitor through the anode-cathode electrodes of a corresponding pilot silicon controlled rectifier and by a corresponding secondary winding of a three-phase transformer at a time as determined by a magnetic amplifier included in the circuit of a second corresponding three-phase transformer secondary winding which supplies gate current to the pilot silicon controlled rectifier and in which each capacitor is charged by the potential of another secondary winding connected thereacross.

For a better understanding of the present invention, together with additional objects, advantages and features thereof, reference is made to the following description and accompanying single FIGURE drawing.

Referring to the drawing, the rectifier bridge silicon controlled rectifier trigger circuit of this invention is set forth in schematic form in combination with a three-phase bridge-type full-wave rectifier 6 having at least three silicon controlled rectifiers 10, 20 and 30, each having anode, cathode and gate electrodes.

As point of reference or ground potential is the same point electrically throughout the system, it has been presented in the drawing by the accepted schematic symbol and referenced by the numeral 5.

A first potential source and a second potential source corresponding to each of bridge silicon controlled rectifiers 10, 20 and 30 is provided. Without intention or inference of a limitation thereto, these potential sources may be supplied by a three-phase transformer 8 having three-phase primary windings 8A, 8B and 8C and a center tapped and an untapped secondary winding corresponding to each of the bridge circuit silicon controlled rectifiers. center tapped secondary winding 11 and untapped secondary winding 12 are the first and second potential sources, respectively, corresponding to bridge circuit silicon controlled rectifier 10, center tapped secondary winding 21 and untapped secondary winding 22 are the first and second potential sources, respectively, corresponding to bridge circuit silicon controlled rectifier 20 and center tapped secondary winding 31 and untapped secondary winding 32 are the first and second potential sources, respectively, corresponding to bridge circuit silicon controlled rectifier 30.

A source of three-phase alternating current potential 4 may be connected across the primary windings 8A, 8B and 8C of three-phase transformer 8, as indicated.

Also provided is a pilot silicon controlled rectifier, a capacitor and an output winding of a magnetic amplifier corresponding to each bridge circuit silicon controlled rectifier. Pilot silicon controlled rectifiers 13, 23 and 33 correspond to respective bridge circuit silicon controlled rectifiers 10, 20 and 30. Capacitors 14, 24 and 34 correspond to respective bridge circuit silicon controlled rectifiers 10, 20 and 30. Output windings 15M, 25M and 35M of the magnetic amplifier correspond to respective bridge circuit silicon controlled rectifiers 10, 20 and 30. Each of these output windings is magnetically coupled to a square hysteresis loop magnetic core 15, 25 and 35, respectively, and at least one control winding is magnetically coupled to all of cores 15, 25 and 35. In the interest of reducing drawing complexity, the single control winding has been illustrated as being magnetically coupled to each of said cores 15, 25 and 35 and is identified by the reference character 15C. Although control winding 15C is schematically represented as three separate windings, it is to be understood that it is a single winding magnetically coupling all three cores of the magnetic amplifier. It is also to be understood that additional control windings, each magnetically coupled to all three cores may also be employed.

Each output winding of the magnetic amplifier and the gate-cathode electrodes of the pilot silicon controlled rectifier corresponding to the same bridge circuit silicon controlled rectifier are connected in series across the first potential source corresponding to the same bridge circuit silicon controlled rectifier. Output winding 15M and the gate-cathode electrodes of pilot silicon controlled rectifier 13, which correspond to bridge circuit silicon controlled rectifier 10, are connected in series across terminal end 11B and center tap 11CT of secondary winding 11, which also corresponds to bridge circuit silicon controlled rectifier 10, through diode 16 and resistor 17, which limits the gate-cathode current through pilot silicon controlled rectifier 13 to a safe value. Output winding 25M and the gate-cathode electrodes of pilot silicon controlled rectifier 23, which correspond to bridge circuit silicon controlled rectifier 20, are connected across terminal end 21B and the center tap 21CT of secondary winding 21, which also corresponds to bridge circuit silicon controlled rectifier 20, through diode 26 and current limiting resistor 27, which limits the gate-cathode current through pilot silicon controlled rectifier 23 to a safe value. Output winding 35M and the gate-cathode electrodes of pilot silicon controlled rectifier 33, which correspond to bridge circuit silicon controlled rectifier 30, are connected across the terminal end 31B and center tap 31CT of secondary winding 31, which also corresponds to bridge circuit silicon controlled rectifier 30, through diode 36 and current limiting resistor 37, which limits the gate-cathode current through pilot silicon controlled rectifier 33 to a safe value.

The anode-cathode electrodes of each of the pilot silicon controlled rectifiers and the gate-cathode electrodes of the bridge circuit silicon controlled rectifier to which it corresponds are connected in series across the corresponding second potential source. The anode-cathode electrodes of pilot silicon controlled rectifier 13 and the gate-cathode electrodes of bridge circuit silicon controlled rectifier 10, to which it corresponds, are connected in series across the corresponding untapped secondary winding 12 through a circuit which may be traced from terminal end 12A thereof, through resistor 18 and diode 19, the anode-cathode electrodes of pilot silicon controlled rectifier 13, the gate-cathode electrodes of bridge circuit silicon controlled rectifier 10 and leads 40 and 41 to terminal end 12B. The anode-cathode electrodes of pilot silicon controlled rectifier 23 and the gate-cathode electrodes of bridge circuit silicon controlled rectifier 20, to which it corresponds, are connected in series across the corresponding untapped secondary winding 22 through a circuit which may be traced from terminal end 22A thereof, through resistor 28 and diode 29, the anode-cathode electrodes of pilot silicon controlled rectifier 23, the gate-cathode electrodes of bridge circuit silicon controlled rectifier 20 and leads 40 and 42 to terminal end 22B. The anode-cathode electrodes of pilot silicon controlled rectifier 33 and the gate-cathode electrodes of bridge circuit silicon controlled rectifier 30, to which it corresponds, are connected in series across the corresponding untapped secondary winding 32 through a circuit which may be traced from terminal end 32A thereof, through resistor 38 and diode 39, the anode-cathode electrodes of pilot silicon controlled rectifier 33, the gate-cathode electrodes of bridge circuit silicon controlled rectifier 30 and leads 41 and 43 to terminal end 32B.

Each of the capacitors are connected across the second potential source corresponding to the same bridge circuit silicon controlled rectifier. Capacitor 14 is connected across untapped secondary winding 12, corresponding to bridge circuit silicon controlled rectifier 10, through resistor 18 and diode 19 and resistor 54 and lead 41, capacitor 24 is connected across untapped secondary winding 22, corresponding to bridge circuit silicon controlled rectifier 20, through resistor 28 and diode 29 and resistor 64 and lead 42 and capacitor 34 is connected across untapped secondary winding 32, corresponding to bridge circuit silicon controlled rectifier 30, through resistor 38 and diode 39 and resistor 74 and lead 43. It may be noted that capacitor 14 is connected to the junction between diode 19 and the anode electrode of pilot silicon controlled rectifier 13, capacitor 24 is connected to the junction between diode 29 and the anode electrode of pilot silicon controlled rectifier 23 and capacitor 34 is connected to the junction between diode 39 and the anode electrode of pilot silicon controlled rectifier 33. Connected in this manner, any charge appearing upon capacitors 14, 24 and 34 is conducted through the anode-cathode electrode of respective pilot silicon controlled rectifiers 13, 23 and 33, when these devices are triggered conductive through the anode-cathode electrodes, and the gate-cathode electrodes of respective bridge circuit silicon controlled rectifiers 10, 20 and 30.

Each of the capacitors 14, 24 and 34 is also connected across another one of the second potential sources. Capacitor 14 is connected across untapped secondary winding 32 through a circuit which may be traced from terminal end 32A thereof, through lead 51, resistor 52, diode 53, capacitor 14, resistor 54 and leads 40 and 43 to terminal end 32B. Capacitor 24 is connected across untapped secondary winding 12 through a circuit which may be traced from terminal end 12A thereof, through lead 61, resistor 62, diode 63, capacitor 24, resistor 64 and leads 40 and 41 to terminal end 12B. Capacitor 34 is connected across untapped secondary winding 22 through a circuit which may be traced from the terminal end 22A thereof, through lead 71, resistor 72, diode 73, capacitor 34, resistor 74 and leads 40 and 42 to terminal end 22B.

The terminal ends of each of the center tapped secondary windings are connected across the terminal ends of the output winding of the magnetic amplifier corresponding to the same bridge circuit silicon controlled rectifier for the purpose of supplying reset current thereto. Terminal ends 11A and 11B of center tapped secondary winding 11 are connected across the series combination of diode 44, resistor 45 and output winding 15M, terminal ends 21A and 21B of center tapped secondary winding 21 are connected across the series combination of diode 46, resistor 47 and output winding 25M and terminal ends 31A and 31B of center tapped secondary winding 31 are connected across the series combination of diode 48, resistor 49 and output winding 35M.

As the circuitry associated with each of bridge silicon controlled rectifiers 10, 20 and 30 is identical and operates in the same manner, only that circuitry associated with bridge silicon controlled rectifier 10 will be explained in detail.

The input signal to the magnetic amplifier is supplied by the source of three-phase alternating current potential 4 applied across the three-phase primary windings 8A, 8B and 8C of three-phase transformer 8. Each of the magnetic amplifier output coils presents either a very high or a very low impedance to the input signal induced in respective center tapped secondary windings 11, 21 and 31. With the magnetic core to which it is magnetically coupled saturated in one direction, each magnetic amplifier output coil presents a low impedance to the input signal of a polarity which will produce magnetic flux in the same direction and a high impedance to the input signal of a polarity which will produce magnetic flux in the opposite direction. The high impedance condition results in nearly the entire input signal being dropped across the output coils and the low impedance condition results in nearly the entire input signal appearing across respective resistors 55, 56 and 57. Assuming there is no current flowing in control winding 15C, over each half cycle of phase A of the three-phase alternating current input signals during which terminal end 8a of primary winding 8A is of a positive polarity with respect to terminal end 8b, terminal end 11A of center tapped secondary winding 11 is of a positive polarity with respect to terminal end 11B. This potential across center tapped secondary winding 11 produces a reset current through output winding 15M from terminal end 11A, through diode 44, resistor 45 and output winding 15M to terminal end 11B. This reset current is of a sufficient magnitude to saturate magnetic core 15 in one direction to a point which will be termed the negative saturation point. Over each half cycle of phase A of the source of three-phase alternating current input signals during which terminal end 8b of primary winding 8A is of a positive polarity with respect to terminal end 8a, terminal end 11B of center tapped secondary winding 11 is of a positive polarity with respect to center tap 11CT. This potential is of a polarity to reverse the direction of magnetic flux in negatively saturated magnetic core 15 but is of an insufficient magnitude to saturate magnetic core 15 in the opposite direction to a point which will be termed the positive saturation point. Consequently, the impedance of output coil 15M remains high and no trigger signal is produced for pilot silicon controlled rectifier 13 and, therefore, no trigger signal is produced for bridge silicon controlled rectifier 10. With no current flow in control winding 15C, therefore, no rectifier bridge silicon controlled rectifier trigger signal is produced. With a flow of energizing current through control winding 15C of a polarity to produce magnetic flux in core 15 in a direction opposite that produced by the reset current, the number of flux lines in magnetic core 15 is reduced, however, the control current is of an insufficient magnitude to reverse the direction of flux in magnetic core 15 to produce saturation thereof at the positive saturation point. With each half cycle of the three-phase alternating current input signal during which terminal end 8b of primary winding 8A is of a positive polarity with terminal end 8a and with control current flowing in control winding 15C, the current produced by the input signal is of a sufficient magnitude to saturate magnetic core 15 in the opposite direction to the point of positive saturation, consequently, the impedance of output coil 15M and the potential thereacross reduces to substantially zero to supply a trigger signal for pilot silicon controlled rectifier 13 and, therefore, a trigger signal for bridge circuit silicon controlled rectifier 10. The amount of flux change in the positive direction produced by control current flowing through the control winding 15C determines both the additional flux change required from the input signal to produce core saturation and, also, the time during each positive half cycle of the input signal potential at which saturation occurs. As output windings 25M and 35M and the associated circuitry operate in the identical phase, this portion of the circuit will not be explained in detail.

When output winding current flow is required, control current is supplied to the control winding 15C. As the circuitry which provides the control current through control winding 15C may be any one of the many circuits well known in the art, and, per se, forms no part of this invention, in the interest of reducing drawing complexity, it has not been indicated in the drawing.

Assuming that the associated control circuitry is not providing control current flow through control winding 15C, no current flows through the respective output windings of the magnetic amplifier. However, capacitor 14 is charged by the potential appearing across untapped secondary windings 12 and 32, capacitor 24 is charged by the potential appearing across untapped secondary windings 22 and 12 and capacitor 34 is charged by the potential appearing across untapped secondary windings 32 and 22.

Should the load 50 supplied by bridge rectifier circuit 6 require a direct current potential, the associated control circuitry produces a control current flow through the control winding 15C of a value which permits the conduction of current through the respective output windings of the magnetic amplifier when the terminal ends 11B, 21B and 31B of the respective center tapped secondary windings are of a positive potential with respect to the respective center tapped terminals 11CT, 21CT and 31CT. Assuming that phase A of the source of three-phase alternating current potential 4 is of a positive polarity and that the associated control circuitry, not shown, has produced a control current flow through control winding 15C of a magnitude at which the input signal may produce a flow of current through the output winding 15M, terminal end 11B of center tapped secondary winding 11 and terminal end 12A of untapped secondary winding 12 is of a positive polarity, as indicated by the transformer winding polarizing dots. Consequently, at the phase angle of this half cycle at which the input signal potential produces a signal current of sufficient magnitude to reverse saturate magnetic core 15, gate current flows from terminal end 11B of center tapped secondary winding 11 through output winding 15M of the magnetic amplifier, diode 16, current limiting resistor 17 and the gate-cathode electrodes of pilot silicon controlled rectifier 13 to the center tap 11CT to trigger pilot silicon controlled rectifier 13 conductive through the anode-cathode electrodes. Upon the initiation of conduction through the anode-cathode electrodes of pilot silicon controlled rectifier 13, capacitor 14 discharges therethrough and through the gate-cathode electrodes of bridge circuit silicon controlled rectifier 10 to trigger this device conductive through the anode-cathode electrodes as phase A of the three-phase alternating current potential source is of a positive polarity. The potential appearing across untapped secondary winding 12 also produces gate current for bridge circuit silicon controlled rectifier 10 which may be traced from terminal end 12A, through resistor 18, diode 19, the anode-cathode electrodes of pilot silicon controlled rectifier 13, the gate-cathode electrodes of bridge circuit silicon controlled rectifier 10 and leads 40 and 41 to terminal end 12B. Consequently, the gate signal applied to bridge circuit silicon controlled rectifier 10 consists of the discharge of capacitor 14 superimposed upon the sinusoidal wave form appearing across untapped secondary winding 12. This gate signal has a rapid rise leading edge produced by the discharge of capacitor 14 and a sinusoidal wave form trailing edge produced by untapped secondary winding 12.

When phase A of a source of three-phase alternating current potential 4 becomes negative, terminal end 11A of center tapped primary winding 11 is positive with respect to terminal end 11B. Consequently, a reset current is supplied in an opposite direction through output winding 15M of the magnetic amplifier through a circuit which may be traced from terminal end 11A of center tapped secondary winding 11, through diode 44, resistor 45 and output winding 15M to terminal end 11B. This flow of current resets magnetic core 15 of the magnetic amplifier for the next half cycle during which phase A of the source of three-phase alternating current potential 4 is of a positive polarity.

When phase B of the source of three-phase alternating current potential becomes positive, the associated trigger signal circuitry operates in a similar manner to provide gate-cathode current for bridge circuit silicon controlled rectifier 20 and when phase C of the source of three-phase alternating current supply potential becomes positive, the associated trigger circuitry operates in a similar manner to provide gate-cathode current for bridge circuit silicon controlled rectifier 10.

From this description, it is apparent that associated controlled circuitry which is sensitive to the demand of load 50 may control the flow of control current through control winding 15C to fire the respective bridge circuit silicon controlled rectifiers 10, 20 and 30 at the phase angle at which the desired potential magnitude is applied to the load 50. That is, as the magnitude of the voltage required by load 50 increases, the control circuitry increases the magnitude of control current through control winding 15C, consequently, bridge silicon controlled rectifiers 10, 20 and 30 are fired earlier during each positive half cycle of the supply potential and as the magnitude of potential required by load 50 decreases, the control circuitry decreases the magnitude of control current through control winding 15C, consequently, these bridge circuit silicon controlled rectifiers are fired later during each positive half cycle.

The function of the interconnection between the capacitors of each trigger circuit and one of the other untapped secondary windings improves the output wave shape for any particular trigger circuit potential. The potential of one of the other trigger circuits is leading the particular circuit's potential by 120° and the other trigger circuit potential is lagging the chosen circuit's potential by 120°. The common connection required by the full-wave bridge circuit configuration provides a common connection in the trigger circuitry. This common connection is the return path for output current in any of the individual trigger circuits and is the common connection of the 12B, 22B and 32B terminals of the untapped secondary windings. By virtue of this connection the untapped secondary windings are connected in a Y configuration. The common terminal of these Y connected windings permits the addition of any of these phase potentials to any other phase potential through rectifier diodes. If the leading phase potential is added through the diode to the chosen phase potential, as indicated in the drawing, each capacitor begins to charge 120° before the chosen phase potential becomes positive and a 60° zero potential period begins when the chosen phase potential becomes negative. If the lagging phase potential is added, each capacitor charges for 120° after the chosen phase potential goes through zero. The net result of the leading cross connection is to maintain full charge on the capacitors for the entire control range while the result of the lagging cross connection is the extension of time that the gate potential may remain positive.

Resistors 18, 28 and 38 limit the gate-cathode current through respective bridge circuit silicon controlled rectifiers 10, 20 and 30 to a safe value. Resistors 55, 56 and 57 provide a path for leakage current for respective output windings 15M, 25M and 35M. Resistors 75, 76 and 77 provide an open circuit output path for respective pilot silicon controlled rectifiers 13, 23 and 33 and improve the $dv/dt$ capability of respective bridge circuit silicon controlled rectifiers 10, 20 and 30. Resistors 54, 64 and 74 protect respective pilot silicon controlled rectifiers 13, 23 and 33 from $di/dt$ damage when the output circuit is shorted. Diodes 19 and 53, 29 and 63, and 39 and 73 prevent respective capacitors 14, 24 and 34 from discharging through untapped secondary windings 12 and 32, 22 and 12 and 32 and 22. Diodes 16, 26 and 36 provide the self-saturating magnetic amplifier operation.

While a preferred embodiment of the present invention has been shown and described, it will be obvious to those skilled in the art that various modifications and substitutions may be made without departing from the spirit of the invention which is to be limited only within the scope of the appended claims.

What is claimed is:

1. A rectifier bridge silicon controlled rectifier trigger circuit comprising in combination with a three-phase bridge-type full-wave rectifier circuit having at least three silicon controlled rectifiers, each having anode, cathode and gate electrodes: a first potential source and a second potential source corresponding to each of said bridge circuit silicon controlled rectifiers; a pilot silicon controlled rectifier having anode, cathode and gate electrodes corresponding to each of said bridge circuit silicon controlled rectifiers; a capacitor corresponding to each of said bridge circuit silicon controlled rectifiers; a magnetic amplifier having a magnetic core and an output winding corresponding to each of said bridge circuit silicon controlled rectifiers; means for connecting each of said output windings and said gate-cathode electrodes of the said pilot silicon controlled rectifier corresponding to the same said bridge circuit silicon controlled rectifier in series across said first potential source corresponding to the same said bridge circuit silicon controlled rectifier; means for connecting said gate-cathode electrodes of each of said bridge circuit silicon controlled rectifiers and said anode-cathode electrodes of the corresponding said pilot silicon controlled rectifier in series across the corresponding said second potential source; means for connecting each of said capacitors across the said second potential source corresponding to the same said bridge circuit silicon controlled rectifier; and means for connecting each of said capacitors across another one of said second potential sources.

2. A rectifier bridge silicon controlled rectifier trigger circuit comprising in combination with a three-phase bridge-type full-wave rectifier circuit having at least three silicon controlled rectifiers, each having anode, cathode and gate electrodes: a three-phase transformer having a three-phase primary winding and a pair of secondary windings corresponding to each of said bridge circuit silicon controlled rectifiers; a pilot silicon controlled rectifier having anode, cathode and gate electrodes corresponding to each of said bridge circuit silicon controlled rectifiers; a capacitor corresponding to each of said bridge circuit silicon controlled rectifiers; a magnetic amplifier having a magnetic core and an output winding corresponding to each of said bridge circuit silicon controlled rectifiers; means for connecting each of said output windings and said gate-cathode electrodes of the said pilot silicon controlled rectifier corresponding to the same said bridge circuit silicon controlled rectifier in series across said first secondary winding of the pair of secondary windings corresponding to the same said bridge circuit silicon controlled rectifier; means for connecting said gate-cathode electrodes of each of said bridge circuit silicon controlled rectifiers and said anode-cathode electrodes of the corresponding said pilot silicon controlled rectifier in series across the corresponding said second secondary winding; means for connecting each of said capacitors across the said second secondary winding corresponding to the same said bridge circuit silicon controlled rectifier; and means for connecting each of said capacitors across another one of said second secondary windings.

3. A rectifier bridge silicon controlled rectifier trigger circuit comprising in combination with a three-phase bridge-type full-wave rectifier circuit having at least three silicon controlled rectifiers, each having anode, cathode and gate electrodes: a three-phase transformer having a three-phase primary winding and a center tapped and an untapped secondary winding corresponding to each of said bridge circuit silicon controlled rectifiers; a pilot silicon controlled rectifier having anode, cathode and gate electrodes corresponding to each of said bridge circuit silicon controlled rectifiers; a capacitor corresponding to each of said bridge circuit silicon controlled rectifiers; a magnetic amplifier having a magnetic core and an output winding corresponding to each of said bridge circuit silicon controlled rectifiers; means for connecting each of said output windings and said gate-cathode electrodes of the said pilot silicon controlled rectifier corresponding to the same said bridge circuit silicon controlled rectifier in series across said center tap and one terminal end of the said center tapped secondary winding corresponding to the same bridge circuit silicon controlled rectifier; means for connecting said gate-cathode electrodes of each of said bridge circuit silicon controlled rectifiers and said anode-cathode electrodes of the corresponding said pilot silicon controlled rectifier in series across the corresponding said untapped secondary winding; means for connecting each of said capacitors across the said untapped secondary winding corresponding to the same said bridge circuit silicon controlled rectifier; means for connecting each of said capacitors across another one of said untapped secondary windings; and means for connecting the terminal ends of each of said center tapped secondary windings across the terminal ends of the said output winding of the said magnetic amplifier corresponding to the same said bridge circuit silicon controlled rectifier.

* * * * *